United States Patent
Buck et al.

[19]

[11] Patent Number: 5,974,345
[45] Date of Patent: Oct. 26, 1999

[54] DAIRY CHEMICAL DISPENSING SYSTEM

[75] Inventors: Robert L. Buck; Kevin L. Torgerson, both of Holmen, Wis.

[73] Assignee: Babson Bros. Co., Naperville, Ill.

[21] Appl. No.: 09/021,625

[22] Filed: Feb. 10, 1998

[51] Int. Cl.$^6$ .................................................. G06F 17/00
[52] U.S. Cl. ........................... 700/479.09; 700/479.1; 700/479.14; 222/61; 417/4; 417/5
[58] Field of Search ........................... 700/479.09, 479.1, 700/479.11, 479.14; 222/61, 642, 14; 417/4, 5, 12, 43, 44.1

[56] References Cited

U.S. PATENT DOCUMENTS

| | | |
|---|---|---|
| Re. 31,659 | 9/1984 | Brown . |
| 3,736,930 | 6/1973 | Georgi ....................................... 222/14 |
| 4,011,838 | 3/1977 | Nordegren et al. . |
| 4,034,713 | 7/1977 | Umbaugh . |
| 4,175,514 | 11/1979 | Souza et al. . |
| 4,208,219 | 6/1980 | Etscheid . |
| 4,209,258 | 6/1980 | Oakes ......................................... 417/43 |
| 4,222,346 | 9/1980 | Reisgies . |
| 4,452,268 | 6/1984 | Icking et al. . |
| 4,462,425 | 7/1984 | Mehus . |
| 4,476,808 | 10/1984 | Meermoller et al. . |
| 4,516,530 | 5/1985 | Reisgies et al. . |
| 4,516,592 | 5/1985 | Schultz et al. . |
| 4,606,297 | 8/1986 | Biicker . |
| 4,845,965 | 7/1989 | Copeland et al. . |
| 5,014,211 | 5/1991 | Turner et al. ....................... 364/479.11 |
| 5,080,040 | 1/1992 | van der Lely et al. . |
| 5,109,347 | 4/1992 | Quick et al. ........................ 364/479.09 |
| 5,195,456 | 3/1993 | van der Lely et al. . |
| 5,208,930 | 5/1993 | Chabard ................................... 222/14 |
| 5,240,380 | 8/1993 | Mabe ........................................ 417/43 |
| 5,272,997 | 12/1993 | van der Lely et al. . |
| 5,313,833 | 5/1994 | Hoefelmayr . |
| 5,316,444 | 5/1994 | Wicnienski ............................... 417/43 |
| 5,339,854 | 8/1994 | Leith . |
| 5,360,320 | 11/1994 | Jameson et al. ........................... 417/5 |
| 5,379,721 | 1/1995 | Dessing et al. . |
| 5,390,105 | 2/1995 | Worley et al. ..................... 364/479.14 |
| 5,390,627 | 2/1995 | van der Berg et al. . |
| 5,433,342 | 7/1995 | Luro ......................................... 222/14 |
| 5,629,863 | 5/1997 | Palozzi et al. ..................... 364/479.09 |

Primary Examiner—William E. Terrell
Assistant Examiner—Khoi H Tran
Attorney, Agent, or Firm—Lathrop & Clark LLP

[57] ABSTRACT

A dairy chemical dispensing system for supplying an amount of at least one chemical to a utilization point in a dairy wash system, comprising: (a) an operator input controller for receiving operator input comprising input of a given amount of chemical to be supplied to the utilization point, and providing a signal corresponding to the operator input; and (b) a chemical dispenser in operative contact with the operator input controller, comprising a chemical source conduit, a pump connected to the chemical source conduit and to a chemical output conduit for supplying the chemical at a predetermined flow rate to the utilization point, a flow sensor connected to the output conduit for measuring an actual flow rate of the chemical through the output conduit, and a data processor electrically coupled to the pump and the flow sensor, where the data processor (1) receives the signal from the operator input controller, and based on that signal, determines a pump activation time necessary to supply the given amount of chemical, (2) periodically monitors the actual flow rate by comparing the actual flow rate to the predetermined flow rate in repeated flow measurement cycles, and (3) generates an alarm signal if the actual flow rate is less than the predetermined flow rate.

33 Claims, 1 Drawing Sheet

DAIRY CHEMICAL DISPENSING SYSTEM

FIELD OF THE INVENTION

The present invention relates to dairy wash systems. More particularly, the present invention relates to a dairy chemical dispensing system for use in a dairy wash system.

BACKGROUND OF THE INVENTION

In a dairy harvesting facility, raw milk from cows is pumped through various milk conduits chillers, valves, and milk quality monitoring equipment to a bulk tank for storage. Because raw milk contains various microorganisms that have the potential to contaminate the milk conduits if those conduits are left untreated for a period of time, it is necessary to clean the milk conduits on a regular basis. It is also necessary to clean the bulk tank after a batch of stored raw milk is removed, at a time prior to that when a new batch of raw milk enters the bulk tank. Therefore, dairy harvesting facilities have washing systems for cleaning the milk conduits and bulk tanks between milkings.

A typical dairy washing system uses various liquid chemicals, such as detergents, acids, and sanitizers, along with water, to clean the milk conduits and bulk tanks. The liquid chemicals are usually dispensed in the sequence detergent/acid/sanitizer each mixed with a volume of water and circulated through the system. However, one or more chemicals can be dispensed simultaneously, so long as they are compatible, i.e., non-reactive, with each other.

The liquid chemicals are dispensed via a chemical dispenser connected to a separate source tank for each chemical to be used. Each chemical is pumped by a separate pump through an input conduit into the chemical dispenser, and exits the dispenser and travels via an output conduit to a utilization point, such as a wash vat, where the chemical can be mixed and/or diluted with water. Separate pumps and conduits are used for each chemical, to avoid unwanted reactions between chemicals during the dispensing process.

It is extremely important that the proper amount of each chemical be supplied to the utilization point for cleaning the milk conduits. If the conduits and/or bulk tank are improperly cleaned, milk passing through the conduits or into the bulk tank can become contaminated, either by microorganisms or excess chemicals in the conduits and/or bulk tank. This contaminated milk must be discarded, at considerable cost to the dairyman.

Systems have been developed to attempt to ensure that the proper amount of chemicals are used. One such system has a visual flow meter coupled to the output conduit for each chemical. Although this system allows an operator to visually verify that a liquid chemical is flowing to the utilization point, it does not allow the operator to determine whether the chemical is flowing at the proper rate. Moreover, chemical dispensers having visual flow meters are often not monitored by an operator, because the chemical dispenser, to avoid undue pressure drops, is typically located in close proximity to the chemical source tanks. These tanks, in turn, are typically located at some distance from the milking parlor, making it difficult for the operator to monitor the visual flow meter.

In an attempt to remedy these problems, an electronic flow sensor was coupled to the output conduit for each chemical. The electronic flow sensor, which was a rotometer that generated a signal corresponding to its rotation, is electrically connected to a programmable logic controller ("PLC"). The PLC is programmed to count a specific number of signals from the flow sensor, and when that number was reached, to turn off the pump. If the specific number of signals is not received in a predetermined period of time that is substantially longer than the amount of time normally necessary for the flow sensor to generate the specified number of signals, the PLC activates an alarm.

This system, while an improvement over a dairy chemical dispensing system having a visual flow sensor, still has several problems. First, since the PLC only looks for a specified number of signals, the operator cannot determine if there is a problem with the chemical dispenser, such as fouled conduits, that is slowing down the chemical flow. Second, since the alarm is only activated if the PLC does not receive the requisite number of signals in a period of time substantially longer than the normal dispensing of the chemical should take, problems that require urgent attention, such as a leak or a disconnected conduit, are not immediately detected. Finally, if the operator wants to change the number of signals counted by the PLC or the time period over which those signals are counted, he must program those changes directly into the PLC at the PLC location. This is inconvenient.

What is needed is a dairy chemical dispensing system that repeatedly monitors the actual chemical flow rate over the entire time the chemical is supposedly being dispensed, so small variations in flow rate that may indicate impending problems or the need for maintenance, as well as major problems such as leaks and disconnected conduit, can be quickly discovered and acted upon. What is also needed is a dairy chemical dispensing system than can be monitored at a location remote from the chemical dispenser itself, which also allows the operator to easily and quickly adjust the specific amount of chemical to be dispensed.

These needs are met by the dairy chemical dispenser of the present invention.

SUMMARY OF THE INVENTION

The dairy chemical dispensing system of the present invention comprises (a) an operator input controller for receiving input from the system operator, such as the amount of a given chemical to be dispensed to a utilization point, in units of volume or dispensing time, and providing a signal corresponding to that input, and (b) a chemical dispenser in operative contact with the operator input controller, comprising a chemical source conduit, a pump connected to the chemical source conduit and to a chemical output conduit for supplying the chemical at a predetermined flow rate to the utilization point, a flow sensor connected to the output conduit for measuring an actual flow rate of the chemical through the output conduit, and a data processor electrically coupled to the pump and the flow sensor. The data processor receives the signal from the operator input controller, and based on that signal determines a pump activation time necessary to provide the inputted amount of chemical. The data processor can activate the pump for a time equal to the pump activation time, or the pump can be activated by the input controller. While the pump is activated, the data processor periodically monitors the actual flow rate by repeatedly comparing the actual flow rate to the predetermined flow rate, and generates an alarm signal if the actual flow rate is less than the predetermined flow rate. The data processor can also adjust the pump activation time due to measured actual flow rate variations, thus ensuring that the proper amount of chemical is supplied, even where the actual flow rate is less than the predetermined flow rate. The data processor further receives a signal from the pump indicating that it is activated, and if no such signal is received, again generates an alarm signal. Finally, the data processor can also be programmed to generate an alarm signal if it does not receive an initial signal from the flow sensor within a predetermined period of time.

The chemical dispenser comprises a separate chemical source conduit, pump, and chemical output conduit for each chemical used by the dairyman. However, only one data processor is needed; the pump and flow sensor for each chemical is connected into that data processor.

The dairy chemical dispensing system of the present invention allows the operator to input information and monitor the system from a location remote from the chemical dispenser. The system of the present invention, because it repeatedly monitors the actual flow rate of each chemical dispensed over the total dispensing time, allows the operator to determine if there are small flow variations present, which may indicate a minor problem or the need for maintenance. Since the prior art systems only count for an overall flow over a fairly long period of time, it will not detect these variations. The system also quickly notifies the operator of these flow variations, or a no flow condition, allowing for a quicker response that is possible with prior art systems. Finally, the system of the present invention ensures that the proper amount of chemical is dispensed to the utilization point in situations where the actual flow rate is less than that of the predetermined flow rate by "self adjusting" the pump activation time to compensate for the lower actual flow rate.

Therefore, it is an object of the present invention to provide a dairy chemical dispensing system that can be monitored and adjusted from a location that is remote from the chemical dispenser itself It is a further object of the present invention to provide information to the operator regarding small variations in flow rate, thus allowing the operator to identify minor problems before they become major problems, and to identify when maintenance or replacement of parts may be necessary.

It is yet an additional object of the present invention to provide a dairy chemical dispensing system that allows for quick operator response to major problems, such as, for example, leaks, spills, and/or disconnected conduits.

It is another object of the present invention to provide a dairy chemical dispensing system that ensures the proper amount of chemical is dispensed.

Further objects, features and advantages of the present invention will be apparent from the following detailed description when taken in conjunction with the accompanying drawing.

DESCRIPTION OF THE PREFERRED EMBODIMENT

Figure 1:
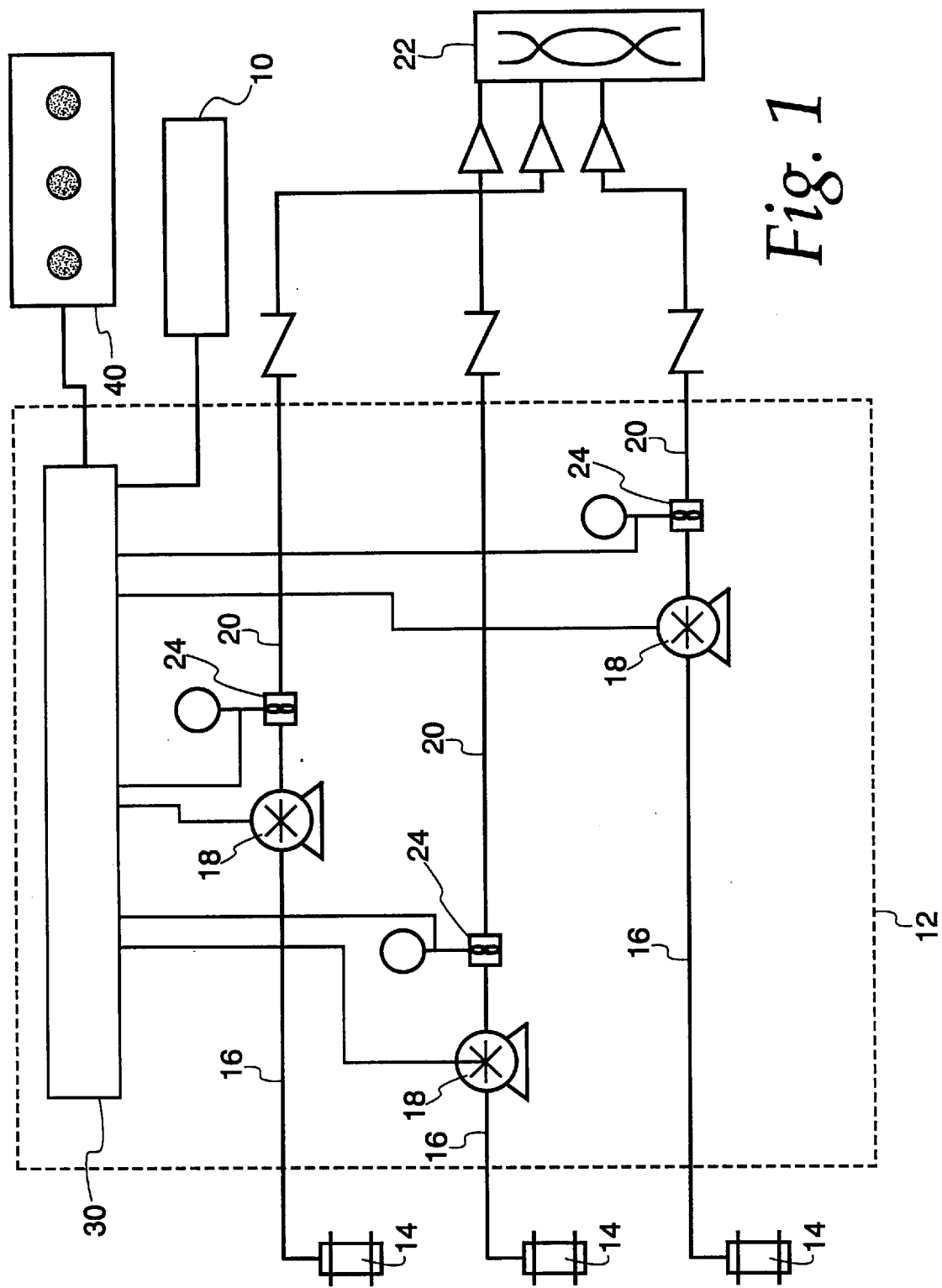
FIG. 1 is a schematic view of a dairy chemical dispensing system of the present invention for dispensing three chemicals.

Referring more particularly to FIG. 1, a dairy chemical dispensing system of the present invention is shown schematically. The system generally comprises an operator input controller 10, in operative contact with a chemical dispenser 12. Although the operator input controller 10 can be located in close proximity to the chemical dispenser 12, it is preferred that the controller 10 be located at the location most convenient for the operator, including a location in the dairy harvesting facility remote from the chemical dispenser location. The operator input controller 10 allows the operator to input, monitor, and adjust various parameters relating to the chemical dispenser, including, but not limited to, the type of chemical or chemicals to be used, and the amount of each chemical, in units of dispensing time or volume, to be dispensed per cleaning cycle. The input controller 10 also preferably includes an alarm to notify the operator of problems and/or maintenance needs relating to the dispensing system. Preferably, the operator input controller is a Navigator Wash Controller or PLC Washer, available from Babson Bros. Co., Naperville, Illinois.

As stated above, the operator input controller 10 is operatively connected to a chemical dispenser 12. As shown in FIG. 1, chemical dispenser 12 is capable of dispensing three separate liquid chemicals, which are typically a detergent, an acid, and a sanitizer. This is preferred. However, the chemical dispenser the system of the present invention can be configured to dispense any number of chemicals desired by the operator. Normally, at least two chemicals are used. These chemicals may be dispensed separately in sequence, or chemicals from two or more source tanks may be dispensed simultaneously as desired by the operator, so long as the chemicals are identical or chemically compatible with each other. The chemical dispenser of the present invention is available from Babson Bros. Co., Naperville, Illinois, under the trademark Pro-FORM™ Chemical Dispenser.

For each chemical to be dispensed, a storage tank 14, which may be located in an area of the dairy harvesting facility different from the location of the chemical dispenser 12, is connected to a chemical source conduit 16. A pump 18 pumps the chemical to be dispensed from the storage tank 12 through the chemical source conduit 16 and an output conduit 20, to a utilization point 22. The pump 18 may be any type capable of being used or actually used in dairy chemical dispensing operations, and may be either a variable speed or constant speed pump. Typically, pumps used in dairy chemical dispensers are 9 oz/min or 40 oz/min displacement pumps. Preferably, the pump 18 in the system of the present invention is a peristaltic pump available in numerous pump capacities, all operated at a single voltage and having identical bolt patterns to make them interchangeable in the chemical dispenser. Such pumps are available from Knight, having displacement rates from 9 oz/min. to 226 oz/min.

A flow sensor 24 is connected to each output conduit 20 for monitoring the actual flow rate of the chemical being dispensed. The flow sensor must be capable of electronically communicating the actual flow rate with a data processor 30. It must also be able to withstand the chemicals used in the dispensing system. Preferably, the flow sensor 24 is an electronic rotometer having a magnet on the rotometer blades that is sensed by a Hall effect sensor on the rotometer housing. In this manner, the Hall effect sensor generates a signal for each pass of the each magnetized rotometer blade. For example, if the rotometer has six magnetized blades, the Hall effect sensor will generate a signal corresponding to ⅙th of a complete rotation of the rotometer, or six signals per complete rotation. Rotometers of this type are available from Gems Sensors, Plainville, Connecticut. Preferably, a Gems™ rotometer having Part No. 159496 is used.

Each pump and flow sensor are electrically connected with a data processor 30. The data processor can be any unit capable of receiving and processing input signals, and generating output based on those signals. For example, the data processor can be a programmable logic controller, a microprocessor, or a printed circuit board. The use of a programmable logic controller, such as a GE Fanuc Series 90 Micro-Mini, available from General Electric Company, is preferred.

For each chemical to be dispensed, the data processor 30 receives operator input, such as the amount of chemical to be dispensed, either in units of time or volume, from the operator input controller 10. Based on that input, it determines a pump activation time necessary for the chosen amount of chemical to be dispensed. The data processor can sends a signal activating the pump 18 to begin the flow of chemical, or the pump can be activated by the signal from the operator input controller. If the pump is activated by a signal from the input controller, the input controller simultaneously sends a signal to the data processor indicating that a signal has been sent to activate the pump. However, it is preferred that the data processor send the pump activation signal. The data processor then receives a signal from the pump 18 indicating that the pump is in fact operating. The data processor can be programmed to activate an alarm 40 if the pump activation signal is not received within a given period of time, preferably from about 2 seconds to about 30 seconds after the pump activation signal is sent from either the data processor or the operator input controller. The data processor can also be programmed to activate an alarm 40 if a signal from the flow sensor is not received within a given period of time, preferably from about 2 seconds to about 30 seconds after the data processor receives the signal from the pump indicating pump operation.

During the pump activation time, the data processor 30 repeatedly measures the actual flow rate of the chemical being dispensed by counting the number of signals received from the flow sensor in a specific time period, or flow measurement cycle. The flow measurement cycle can be constant, or can vary in length over the pump activation time. Preferably, the data processor then repeats this process of actual flow measurement using a constant flow measurement cycle over the entire time the pump is activated. Each flow measurement cycle should be substantially shorter than the total pump activation time, so that chemical flow deviations or other chemical flow problems can be quickly identified. Preferably, each flow measurement cycle is the same length of time and should be from about 3 seconds to about 10 seconds; most preferably, each flow measurement cycle should be from about 3 second to about 5 seconds. Thus, for a pump activation time of 30 seconds, the data processor 30 will preferably have 6 to 10 equal flow measurement cycles.

However, as stated above, the flow measurement cycles can be varied in length over the pump activation time. For example, it may be desirable to use a short flow measurement cycle early in the pump activation time, and a larger flow measurement cycle later in the pump activation time.

Preferably, the data processor will have at least 4 flow measurement cycles during the pump activation time. The flow measurement cycle time can be adjusted as desired by the operator, depending on the amount of chemical to be dispensed, or other factors.

If during any of the flow measurement cycles the data processor does not receive a predetermined calculated number of signals from the flow sensor corresponding to a predetermined normal chemical flow, the data processor activates one or more alarms 40 indicating that the actual chemical flow rate is deviating from what the predetermined flow rate should be. These alarms can include audible alarms, such as horns or sirens, or visual alarms, such as lights. The data processor can also provide an alarm to the operator input controller 10. The data processor can be further programmed to adjust the pump activation time based on the actual flow rate of the chemical, as measured by the flow sensor. Thus, if the measured flow rate is less than the normal, or predetermined flow rate, the data processor will increase the pump activation time proportionately, so that the inputted amount of chemical is dispensed.

The data processor 30 can also be programmed to stop the pump if the actual flow rate deviates from the normal flow rate by a given amount, indicating a significant problem with the system, such as a disconnected output conduit. Or, if desired, the data processor can be programmed to deactivate the pump under any alarm situation. Moreover, the data process can be programmed to simultaneously deactivate the pumps for more than one chemical source tank, if due to some error in the system, it receives signals from more than one flow sensor indicating simultaneous flow of chemically incompatible chemicals. The data processor can further be programmed to provide information to the operator input controller for operator review, such as chemical storage tank levels.

The data process or of the present invention may operate in a "closed loop control" system. "Closed loop control" is responsive to the actual response of the thing being controlled and is particularly desirable when the parameter being controlled is a nonlinear function of the controlling action such as chemical dispensing rates. The control logic or laws can be predetermined or can be learned from the previous responses of the system. Such a learning system is known as an "adaptive control system" or "fuzzy logic system". Thus, a closed loop control system, optionally supplied with adaptive or fuzzy logic, will be most effective at achieving the desired result of controlling chemical dispensing rates.

Typically many factors influencing chemical dispensing can be monitored and controlled in a closed loop system including, pump rates and wear, conduit size and blockages, chemical concentration and viscosity, and water temperature. In the past, an experienced operator would continually monitor these parameters by walking through the dairy harvesting facility. Naturally, this sort of process takes time and is subject to errors. Using a closed loop controller as the data processor 30 and adaptive or fuzzy logic permits remote monitoring and control of these system parameters and results in manipulating the controlled parameters to reduce milk loss and remain within tight compliance of FDA and USDA regulations. Additional control parameters allow the data processor 30 greater capability in controlling a particular parameter. Also, the inherent physical attributes of a particular milking system play a role in the level of control available.

It should be understood that the particular control laws and the type of loop closure, employing fixed control logic, adaptive control logic, or fuzzy control logic are machine and system specific. However, the more parameters being controlled and the more complex the underlying physical relationship between the parameters being control led and the mechanical system for controlling the parameters, the greater the need for adaptive or fuzzy control logic. As larger dairy harvesting facilities become commonplace, the need for the present invention are apparent.

It is understood that the invention herein is not limited to the particular construction and arrangement of components herein illustrated and described, but embraces such modified forms thereof as come within the scope of the following claims.

We claim:

1. A dairy chemical dispensing system for supplying an amount of at least one chemical to a utilization point in a dairy wash system, comprising:
   (a) an operator input controller for receiving operator input comprising input of a given amount of chemical to be supplied to the utilization point, and providing a signal corresponding to the operator input; and
   (b) a chemical dispenser in operative contact with the operator input controller, comprising a chemical source conduit, a pump connected to the chemical source conduit and to a chemical output conduit for supplying the chemical at a predetermined flow rate to the utilization point, a flow sensor connected to the output conduit for measuring an actual flow rate of the chemical through the output conduit, and a data processor electrically coupled to the pump and the flow sensor, where the data processor
      (1) receives the signal from the operator input controller, and based on that signal, determines a pump activation time necessary to supply the given amount of chemical,
      (2) periodically monitors the actual flow rate by comparing the actual flow rate to the predetermined flow rate in repeated flow measurement cycles, and
      (3) generates an alarm signal if the actual flow rate is less than the predetermined flow rate.

2. The system of claim 1, where the pump is a peristaltic pump.

3. The system of claim 1, where the flow sensor is a rotometer.

4. The system of claim 1, where the data processor is a programmable logic controller.

5. The system of claim 1, where the data process monitors the actual flow rate for the entire pump activation time.

6. The system of claim 1, where the data processor monitors the actual flow rate by comparing the actual flow rate to the predetermined flow rate in at least 4 flow measurement cycles.

7. The system of claim 1, where each flow measurement cycle is equal in time.

8. The system of claim 7, where each flow measurement cycle is from about 3 seconds to 10 seconds.

9. The system of claim 8, where each flow measurement cycle is from about 3 seconds to 5 seconds.

10. The system of claim 1, where the flow sensor generates a signal corresponding to the actual flow rate, which is received by the logic controller.

11. The system of claim 3, where the rotometer measures the actual flow rate by generating a signal each time a rotometer blade passes a Hall effect sensor.

12. The system of claim 11, where the data processor monitors the actual flow rate by counting the signals received from the rotometer for at least 4 flow measurement cycles.

13. The system of claim 12, where each flow measurement cycle is equal in time.

14. The system of claim 13, where each flow measurement cycle is from about 3 seconds to about 10 seconds.

15. The system of claim 14, where each flow measurement cycle is about 3 seconds to 5 seconds.

16. The system of claim 1, where at least two separate chemicals are dispensed.

17. The system of claim 1, where the data processor additionally provides an alarm signal if a signal from the pump is not received within a given time after a signal to activate the pump is sent to the pump by the data processor or the operator input controller.

18. The system of claim 1, where the data processor additionally provides an alarm signal if a signal from the flow sensor is not received within a given time of the data processor receiving a signal from the pump indicating pump activation.

19. The system of claim 1, where the data processor additionally deactivates the pump when an alarm signal is generated.

20. The system of claim 1, where the data processor additionally adjusts the pump activation time to provide the given amount of chemical where the actual flow rate is less than the predetermined flow rate.

21. The system of claim 1, where the data processor additionally sends a signal to activate the pump for a time equal to the pump activation time.

22. A dairy chemical dispensing system for supplying an amount of at least one chemical to a utilization point in a dairy wash system, comprising:
   (a) an operator input controller for receiving operator input comprising input of a given amount of chemical to be supplied to the utilization point, and providing a signal corresponding to the operator input; and
   (b) a chemical dispenser in operative contact with the operator input controller, comprising a chemical source conduit, a peristaltic pump connected to the chemical source conduit and to a chemical output conduit for supplying the chemical at a predetermined flow rate to the utilization point, a rotometer connected to the output conduit for measuring an actual flow rate of the chemical through the output conduit, and a programmable logic controller electrically coupled to the pump and the rotometer, where the logic controller
      (1) receives the signal from the operator input controller, and based on that signal, determines a pump activation time necessary to supply the given amount of chemical,
      (2) generates an alarm signal if a signal from the pump indicating the pump is operating is not received within a given time after a signal to activate the pump is sent to the pump by the programmable logic controller or the operator input controller,
      (3) periodically monitors the actual flow rate by comparing the actual flow rate to the predetermined flow rate in repeated equal flow measurement cycles, and
      (4) generates an alarm signal if the actual flow rate is less than the predetermined flow rate.

23. The system of claim 22, where each flow measurement cycle is from about 3 seconds to about 10 seconds.

24. The system of claim 23, where each flow measurement cycle is from about 3 seconds to about 5 seconds.

25. The system of claim 22, where the logic controller monitors the actual flow rate for at least 4 flow measurement cycles.

26. The system of claim 22, where the rotometer measures the actual flow rate by generating a signal each time a rotometer blade passes a Hall effect sensor.

27. The system of claim 26, where the logic controller monitors the actual flow rate by counting the signals received from the rotometer for at least 4 flow measurement cycles.

28. The system of claim 22, where at least two chemicals are dispensed.

29. The system of claim 22, where the logic controller additionally deactivates the pump when an alarm signal is generated.

30. The system of claim 22, where the logic controller additionally adjusts the pump activation time to provide the given amount of chemical where the actual flow rate is less than the predetermined flow rate.

31. The system of claim 22, where the logic controller additionally provides an alarm signal if a signal from the rotometer is not received within a given time of pump activation by the controller.

32. The system of claim 22, where the logic controller operates in a closed loop control system.

33. The system of claim 22, where the logic controller sends a signal to the pump to activate the pump for a time equal to the pump activation time.

* * * * *